US012637485B2

(12) United States Patent
Lee et al.

(10) Patent No.: US 12,637,485 B2
(45) Date of Patent: May 26, 2026

(54) METHOD OF MANUFACTURING ALKOXYSILANE COMPOUND

(71) Applicant: LG CHEM, LTD., Seoul (KR)

(72) Inventors: Kyu Reon Lee, Daejeon (KR); Se Won Baek, Daejeon (KR)

(73) Assignee: LG CHEM, LTD., Seoul (KR)

( * ) Notice: Subject to any disclaimer, the term of this patent is extended or adjusted under 35 U.S.C. 154(b) by 522 days.

(21) Appl. No.: 18/018,327

(22) PCT Filed: Jul. 30, 2021

(86) PCT No.: PCT/KR2021/009998
§ 371 (c)(1),
(2) Date: Jan. 27, 2023

(87) PCT Pub. No.: WO2022/025715
PCT Pub. Date: Feb. 3, 2022

(65) Prior Publication Data
US 2023/0227479 A1 Jul. 20, 2023

(30) Foreign Application Priority Data

Jul. 31, 2020 (KR) ........................ 10-2020-0096159
Jul. 29, 2021 (KR) ........................ 10-2021-0100048

(51) Int. Cl.
C07F 7/18 (2006.01)

(52) U.S. Cl.
CPC .................................. C07F 7/188 (2013.01)

(58) Field of Classification Search
CPC .............. C07F 7/188; C07F 7/20; C07F 7/10
See application file for complete search history.

(56) References Cited

U.S. PATENT DOCUMENTS

| | | | |
|---|---|---|---|
| 5,157,139 A | 10/1992 | Legrow et al. | |
| 5,556,999 A | 9/1996 | Yamada et al. | |
| 6,258,972 B1 * | 7/2001 | Nakaoka | G03F 7/0751 |
| | | | 106/287.15 |
| 6,323,356 B1 | 11/2001 | Lowenberg et al. | |
| 6,613,399 B2 * | 9/2003 | Miyamoto | B41M 5/52 |
| | | | 427/299 |
| 2004/0076573 A1 | 4/2004 | Knasiak | |
| 2007/0244249 A1 * | 10/2007 | Correia | C09K 3/1018 |
| | | | 524/588 |
| 2011/0240907 A1 | 10/2011 | Sharma et al. | |
| 2012/0025127 A1 | 2/2012 | Yeo et al. | |
| 2015/0340541 A1 * | 11/2015 | Koehler | H10F 71/00 |
| | | | 501/14 |
| 2018/0010726 A1 | 1/2018 | Kim et al. | |
| 2018/0179073 A1 | 6/2018 | Oh et al. | |
| 2019/0107242 A1 * | 4/2019 | Kim | C01B 33/1585 |
| 2019/0153169 A1 * | 5/2019 | Huang | C08G 77/34 |
| 2019/0276322 A1 | 9/2019 | Kim et al. | |
| 2023/0287019 A1 * | 9/2023 | Lee | C07F 7/188 |

FOREIGN PATENT DOCUMENTS

| | | | |
|---|---|---|---|
| CN | 104151384 A | * | 11/2014 |
| CN | 104513263 | | 4/2015 |
| CN | 110817888 | | 2/2020 |
| JP | H05247061 | | 9/1993 |
| JP | 2907035 | | 6/1999 |
| JP | 2001139583 | | 5/2001 |
| JP | 2014-224068 | | 12/2014 |
| KR | 10-0242750 | | 3/2000 |
| KR | 10-2010-0133268 | | 12/2010 |
| KR | 10-2012-0017952 | | 2/2012 |
| KR | 20120126741 | | 11/2012 |
| KR | 10-2015-0143913 | | 12/2015 |
| KR | 10-2016-0100082 | | 8/2016 |
| KR | 10-1748527 | | 6/2017 |
| KR | 10-2018-0124663 | | 11/2018 |
| KR | 10-2019-0008007 | | 1/2019 |
| WO | 2016167494 | | 10/2016 |

OTHER PUBLICATIONS

S. Langer et al, 23 the Journal of Organic Chemistry, 50-58 (1958) (Year: 1958).*
R. Schrock et al., 26 Inorganic Synthesis, 44-51 (1989) (Year: 1989).*
N.G. Anderson, Practical Process & Research Development 203-267, (2000) (Year: 2000).*
J. Leonard et al., Advanced Practical Organic Chemistry 128-226 (2nd ed., 1995) (Year: 1995).*
J. March, Advanced Organic Chemistry Reactions, Mechanisms and Structure 248-272 (4th ed., 1992) (Year: 1992).*
Heller et al., "pK$_a$ values in the undergraduate curriculum: introducing pK$_a$ values measured in DMSO to illustrate solvent effects," ChemTexts, 6:15 (2020), 17 pages.
Richard R. Schrock et al. (1989), "2,2-Dimethylproopylidyne Tungsten(VI) Complexes and Precursors for their Syntheses," Inorganic Syntheses, vol. 26, pp. 44-51.
Stanley H. Langer et al. (1957), "Preparation and Properties of Trimethylsilyl Ethers and Related Compounds," The Journal of Organic Chemistry, vol. 23, pp. 50-58.

* cited by examiner

*Primary Examiner* — Alexander R Pagano
(74) *Attorney, Agent, or Firm* — Bryan Cave Leighton Paisner LLP

(57) ABSTRACT

Provided is a method of manufacturing an alkoxysilane compound, the method capable of more effectively removing ammonia generated as a byproduct when the alkoxysilane compound is manufactured with a silazane-based compound by adding and reacting a silazane-based compound. The method includes: adding an alcohol to a silazane-based compound and allowing the alcohol to react with the silazane-based compound to manufacture a first mixture containing an alkoxysilane compound and ammonia; adding an acid having a pKa of 2-6.5 to the first mixture to prepare a second mixture containing the alkoxysilane compound and an ammonium salt; adding an aqueous solvent to the second mixture to dissolve the ammonium salt; and separating and removing the ammonium salt.

12 Claims, No Drawings

METHOD OF MANUFACTURING ALKOXYSILANE COMPOUND

CROSS-REFERENCE TO RELATED APPLICATIONS

This application is a National Stage Application of International Application No. PCT/KR2021/009998 filed on Jul. 30, 2021, which claims priority to and the benefit of Korean Patent Application Nos. 10-2020-0096159, filed Jul. 31, 2020 and 10-2021-0100048, filed Jul. 29, 2021, in the Korean Intellectual Property Office, the disclosures of which are incorporated herein by reference in its entirety.

TECHNICAL FIELD

The present invention relates to a method of manufacturing an alkoxysilane compound, and more particularly, to a method of manufacturing an alkoxysilane compound used for hydrophobic surface modification of a silica aerogel.

BACKGROUND

Aerogels are highly porous materials that are composed of nanoparticles, and have attracted attention for use as high-efficiency insulating materials, soundproof materials, and the like because they have high porosity, a high specific surface area, and low thermal conductivity. Because such aerogels have very low mechanical strength due to their porous structure, aerogel composites, in which an aerogel is impregnated into fibrous blankets formed of existing insulating fibers (such as organic or inorganic fibers) so that the aerogel is bound to the fibrous blankets, have been developed. As one example, a silica aerogel-containing blanket using a silica aerogel is manufactured through a silica sol preparation step, a gelation step, an aging step, a surface modification step, and a drying step.

A silazane-based compound used as a surface modifying agent in a step of surface modifying a silica aerogel and a silica aerogel-containing blanket is decomposed into an alkoxysilane compound or a silanol compound to generate a large amount of $NH_3$. $NH_3$ is dissolved in a solvent present in a hydrogel, and reacted with carbon dioxide, which is used as an extraction solvent during subsequent supercritical drying, to form ammonium carbonate salts. Then, as the temperature decreases, the ammonium carbonate salts precipitate to form a solid-phase powder, which causes problems such as scale formation, pipe or valve clogging, or the like in subsequent processes.

Therefore, it has been preferred to use an alkoxysilane compound, which does not generate ammonia, instead of a silazane-based compound, as the surface modifying agent in the step of surface modifying a silica aerogel or a silica aerogel-containing blanket. Accordingly, there is a need for a novel method of manufacturing an alkoxysilane compound capable of more effectively removing ammonia generated as a by-product when an alkoxysilane compound is manufactured using the silazane-based compound.

PRIOR ART DOCUMENT

Patent Document

Patent Document 1: Korean Patent Publication No. 10-2016-0100082

BRIEF DESCRIPTION

Technical Problem

Therefore, it is an object of the present invention to provide a novel method of manufacturing an alkoxysilane compound capable of more effectively removing ammonia generated as a by-product during a process of manufacturing an alkoxysilane compound using a silazane-based compound.

Technical Solution

To achieve the above object, according to one aspect of the present invention, there is provided a method of manufacturing an alkoxysilane compound, which includes: (1) adding an alcohol to a silazane-based compound of the following Formula 1 and allowing the alcohol to react with the silazane-based compound to prepare a first mixture including an alkoxysilane compound and ammonia; (2) adding an acid with pKa 2 to 6.5 to the first mixture and allowing the acid to react with the first mixture to prepare a second mixture including the alkoxysilane compound and an ammonium salt; (3) adding an aqueous solvent to the second mixture to dissolve the ammonium salt; and (4) separating and removing the aqueous layer, in which the ammonium salt is dissolved, to obtain the alkoxysilane compound:

$$(R_1)_n(R_2)_{3-n}Si-\overset{H}{\underset{}{N}}-Si(R_2)_{3-n}(R_1)_n \qquad \text{[Formula 1]}$$

wherein $R_1$ is an alkyl group having 1 to 8 carbon atoms, $R_2$ is a hydrogen atom or an alkyl group having 1 to 8 carbon atoms, and n is an integer ranging from 1 to 3.

Advantageous Effects

In the method of manufacturing an alkoxysilane compound according to the present invention, ammonia formed as a by-product can be converted into an ammonium salt and effectively removed during a process of manufacturing an alkoxysilane compound using a silazane-based compound.

DETAILED DESCRIPTION

Hereinafter, the present invention will be described in further detail in order to aid in understanding the present invention.

The terms and words used in this specification and the appended claims are not intended to be construed as having common and dictionary meanings but are construed as having meanings and concepts corresponding to the technical spirit of the present invention in view of the principle that the present inventors can properly define the concepts of the terms and words in order to describe his/her invention in the best way.

A method of manufacturing an alkoxysilane compound according to the present invention includes: (1) adding an alcohol to a silazane-based compound of the following Formula 1 and allowing the alcohol to react with the silazane-based compound to prepare a first mixture including an alkoxysilane compound and ammonia; (2) adding an acid with pKa 2 to 6.5 to the first mixture and allowing the acid to react with the first mixture to prepare a second mixture including the alkoxysilane compound and an ammonium salt; (3) adding an aqueous solvent to the second mixture to dissolve the ammonium salt; and (4) separating and removing the aqueous layer, in which the ammonium salt is dissolved, to obtain the alkoxysilane compound:

$$(R_1)_n(R_2)_{3-n}Si-\overset{H}{N}-Si(R_2)_{3-n}(R_1)_n \qquad \text{[Formula 1]}$$

wherein $R_1$ is an alkyl group having 1 to 8 carbon atoms, $R_2$ is a hydrogen atom or an alkyl group having 1 to 8 carbon atoms, and n is an integer ranging from 1 to 3.

(1) Adding Alcohol to Silazane-Based Compound of Formula 1 and Allowing Alcohol to React with Silazane-Based Compound to Prepare First Mixture Including Alkoxysilane Compound and Ammonia In Step (1), an alcohol is added and reacted with a silazane-based compound of the following Formula 1 to synthesize an alkoxysilane compound. In this case, a first mixture including an alkoxysilane compound and ammonia is prepared while ammonia is generated as a by-product:

$$(R_1)_n(R_2)_{3-n}Si-\overset{H}{N}-Si(R_2)_{3-n}(R_1)_n \qquad \text{[Formula 1]}$$

wherein $R_1$ is an alkyl group having 1 to 8 carbon atoms, $R_2$ is a hydrogen atom or an alkyl group having 1 to 8 carbon atoms, and n is an integer ranging from 1 to 3.

Also, $R_1$ can be an alkyl group having 1 to 6 carbon atoms, and $R_2$ can be a hydrogen atom or an alkyl group having 1 to 6 carbon atoms.

In addition, $R_1$ can be an alkyl group having 1 to 4 carbon atoms, $R_2$ can be a hydrogen atom or an alkyl group having 1 to 4 carbon atoms.

According to one embodiment of the present invention, the silazane-based compound can include one or more selected from the group consisting of a dialkyldisilazane, a tetraalkyldisilazane, and a hexaalkyldisilazane.

Also, specific examples of the silazane-based compound can include 1,3-diethyldisilazane, 1,1,3,3-tetramethyl-disilazane, 1,1,3,3-tetraethyldisilazane, 1,1,1,3,3,3-hexamethyl-disilazane (HMDS), 1,1,1,3,3,3-hexaethyldisilazane, 1,1,3,3-tetraethyldisilazane, 1,3-diisopropyldisilazane, or the like, which can be used alone or as a mixture thereof.

Meanwhile, examples of the alcohol can include monohydric alcohols such as methanol, ethanol, propanol, isopropanol, butanol, pentanol, hexanol, heptanol, octanol, and the like, dihydric alcohols such as glycerol, ethylene glycol, dipropylene glycol, and the like, which can be used alone or as a mixture thereof. According to one embodiment of the present invention, the alcohol can include one or more selected from the group consisting of methanol, ethanol, propanol, isopropanol, butanol, pentanol, hexanol, heptanol, octanol, glycerol, ethylene glycol, and dipropylene glycol. Specifically, the alcohol can include one or more selected from the group consisting of methanol, ethanol, propanol, isopropanol, butanol, pentanol, and hexanol. More specifically, the alcohol can include one or more selected from the group consisting of methanol, ethanol, propanol, isopropanol, and butanol.

The alkoxysilane compound synthesized by adding an alcohol to the silazane-based compound of Formula 1 and allowing the alcohol to react with the silazane-based compound can include one or more selected from the group consisting of a monoalkoxysilane compound, a dialkoxysilane compound, and a trialkoxysilane compound. When the alcohol is a compound of the following Formula 2, the alkoxysilane compound can be specifically a compound of the following Formula 3:

$$R_3OH \qquad \text{[Formula 2]}$$

$$(R_1)_n(R_2)_{3-n}Si-O-R_3 \qquad \text{[Formula 3]}$$

wherein $R_1$ and $R_3$ are each independently an alkyl group having 1 to 8 carbon atoms, $R_2$ is a hydrogen atom or an alkyl group having 1 to 8 carbon atoms, and n is an integer ranging from 1 to 3.

Also, $R_1$ and $R_3$ can be each independently an alkyl group having 1 to 6 carbon atoms, and $R_2$ can be a hydrogen atom or an alkyl group having 1 to 6 carbon atoms.

In addition, $R_1$ and $R_3$ can be each independently an alkyl group having 1 to 4 carbon atoms, $R_2$ can be each independently a hydrogen atom or an alkyl group having 1 to 4 carbon atoms.

The reaction of the alcohol with the silazane-based compound can be the following Scheme 1. In this case, one equivalent of the silazane-based compound is reacted with 2 equivalents of the alcohol to generate 2 equivalents of the alkoxysilane compound, and one equivalent of ammonia is generated as a by-product. The first mixture thus prepared can include an alkoxysilane compound and ammonia:

[Scheme 1]

$$(R_1)_n(R_2)_{3-n}Si-\overset{H}{N}-Si(R_2)_{3-n}(R_1)_n + 2R_3OH \longrightarrow$$
$$2((R_1)_n(R_2)_{3-n}Si-O-R_3) + NH_3$$

wherein $R_1$ to $R_3$ and n are as defined in Formulas 1, 2, and 3.

(2) Adding Acid with pKa 2 to 6.5 to First Mixture and Allowing Acid to React with First Mixture to Prepare Second Mixture Including Alkoxysilane Compound and Ammonium Salt In Step (2), an acid with pKa 2 to 6.5 is added and reacted with the prepared first mixture so that ammonia is converted into an ammonium salt through a reaction of ammonia with the acid with pKa 2 to 6.5. Then, the ammonia converted into the ammonium salt can be removed through subsequent processes.

It is apparent that ammonia included in the first mixture is reacted with the acid so that the ammonia is converted into an ammonium salt through an acid-base neutralization reaction. However, it should be considered that the acid added to the first mixture can cause a side reaction with the alkoxysilane compound that is a target compound included in the first mixture. The alkoxysilane compound can be decomposed into an alkylsilanol and an alkyldisiloxane in an acidic aqueous solution, and such a side reaction causes a decrease in yield of the alkoxysilane compound to be manufactured according to the present invention. When the ammonia included in the first mixture is reacted with the acid to generate an ammonium salt and the ammonium salt is dissolved so that the first mixture becomes weakly acidic, the alkoxysilane compound included in the first mixture is decomposed into an alkylsilanol and an alkyldisiloxane.

Therefore, in Step (2), the acid with pKa 2 to 6.5 can be added and reacted with the first mixture. In this way, the second mixture including the alkoxysilane compound and an ammonium salt is prepared through an acid-base reaction of ammonia with the acid.

Specifically, the acid with pKa 2 to 6.5 can include one or more selected from the group consisting of acetic acid, phosphoric acid, fluoroacetic acid, chloroacetic acid, citric acid, and formic acid.

According to one embodiment of the present invention, the acid can also be an acid with pKa 3 to 6.5, and more specifically an acid with pKa 4 to 5. According to one embodiment of the present invention, acetic acid can be used as acid. In this case, the acetic acid has a pKa of 4.75. When the ammonium salt generated after the acid is reacted with ammonia with pKb 4.75 is dissolved again, the pH value of the resulting solution can become close to pH 7, thereby inhibiting the side reaction in which the alkoxysilane compound is decomposed into an alkylsilane and an alkyldisiloxane.

When the acid with pKa 2 to 6.5 is added and reacted with the first mixture to prepare the second mixture including the alkoxysilane compound and an ammonium salt, the pH of the second mixture can be in a range of pH 5 to 7.5, specifically in a range of pH 6.5 to 7.5, or 6 to 7, and more specifically pH 7. When the pH of the second mixture satisfies the above pH range, a side reaction in which the alkoxysilane compound is decomposed into an alkylsilane and an alkyldisiloxane can be inhibited.

The acid with pKa 2 to 6.5 can be added to the first mixture at an equivalence ratio of 1:1 to 2:1, specifically an equivalence ratio of 1:1 to 1.5:1, and more specifically an equivalence ratio of 1:1 with respect to the ammonia in the first mixture. When the acid is added to the first mixture at the above equivalence ratio with respect to the ammonia in the first mixture, ammonia can be effectively removed, and a side reaction in which the alkoxysilane compound is decomposed into an alkylsilane and an alkyldisiloxane can also be inhibited. When the acid is added at an amount much lower than ammonia in the first mixture, ammonia can be not completely converted into the ammonium salt, which results in poor ammonia removal efficiency, or the generated ammonium salt can be dissolved again to generate ammonia. On the other hand, when the acid is added at an amount much larger than ammonia in the first mixture, the pH of the second mixture can be lowered, and a side reaction in which the alkoxysilane compound is decomposed into an alkylsilane and an alkyldisiloxane can be induced.

According to one embodiment of the present invention, when the acid with pKa 2 to 6.5 is acetic acid, the acetic acid can be added at the same equivalent(s) as ammonia in the first mixture. Because the acetic acid has a pKa of 4.75, which is identical to the pKb of the ammonia, when the acetic acid is added to the first mixture at the same equivalent(s) as ammonia in the first mixture, the pH of the prepared second mixture including the alkoxysilane compound and the ammonium salt becomes close to pH 7, which makes it possible to prevent the problems regarding the conversion of the alkoxysilane compound.

In order to add the acid with pKa 2 to 6.5 to the first mixture at the above equivalence ratio with respect to ammonia in the first mixture, the method of manufacturing an alkoxysilane compound according to one embodiment of the present invention can further include: measuring a concentration of ammonia present in the first mixture before adding the acid to the first mixture. For example, after the alcohol is added and reacted with the silazane-based compound of Formula 1 as shown in Step (1), a concentration of ammonia present in the first mixture can be measured.

Thereafter, the acid can be added at an appropriate equivalence ratio based on the concentration of ammonia.

(3) Adding Aqueous Solvent to Second Mixture to Dissolve Ammonium Salt

In Step (3), an aqueous solvent is added to the second mixture to dissolve the ammonium salt converted from ammonia in Step (2). The second mixture includes an alkoxysilane compound and an ammonium salt. In this case, because the alkoxysilane compound is not dissolved in the aqueous solvent and only the ammonium salt is dissolved in the aqueous solvent, the ammonium salt can be separated into an aqueous layer.

The aqueous solvent is used to dissolve the ammonium salt converted from ammonia in Step (2). Therefore, the aqueous solvent can be used to dissolve the ammonium salt without dissolving the alkoxysilane compound. For example, the aqueous solvent can be water. In this case, the water can be process water, specifically distilled water or ion-exchanged water.

(4) Separating and Removing Aqueous Layer in which Ammonium Salt is Dissolved in Order to Obtain Alkoxysilane Compound In Step (4), an aqueous layer in which the ammonium salt is dissolved is separated and removed from an organic layer of the alkoxysilane compound to obtain a desired alkoxysilane compound.

As such, the alkoxysilane compound used for hydrophobic surface modification of a silica aerogel can be manufactured from the silazane-based compound using the method of manufacturing an alkoxysilane compound according to the present invention.

Specifically, according to one embodiment of the present invention, the silazane-based compound of Formula 1 can be hexamethyldisilazane, the alcohol can be ethanol, and the acid with pKa 2 to 6.5 can be acetic acid.

When ethanol is added and reacted with the hexamethyldisilazane, a first mixture including trimethylethoxysilane and ammonia is prepared.

When ammonia included in the first mixture is reacted with acetic acid, ammonia is converted into an ammonium salt, and the acetic acid added according to the equivalent(s) of ammonia does not affect the trimethylethoxysilane. In this way, the method of manufacturing an alkoxysilane compound according to one embodiment of the present invention can have an effect of converting ammonia, which is a by-product generated by the decomposition of the hexamethyldisilazane without any side reactions of the trimethylethoxysilane, into an ammonium salt in order to remove ammonia.

Meanwhile, according to one embodiment of the present invention, the reaction of the alcohol with the silazane-based compound of Step (1) can be performed in the presence of an acid catalyst. The acid catalyst can be used to promote a reaction of the alcohol with the silazane-based compound. In this case, the acid catalyst can include one or more selected from the group consisting of nitric acid, hydrochloric acid, acetic acid, sulfuric acid, and hydrofluoric acid.

Hereinafter, exemplary embodiments of the present invention will be described in detail so that a person having ordinary skill in the art to which the present invention belongs can easily put the invention into practice. However, it should be understood that the present invention can be embodied in various forms and is not intended to limit the exemplary embodiments described herein.

Example 1

A solution obtained by mixing hexamethyldisilazane (HMDS), ethanol, and HCl at a mole ratio of 1:2:0.00064 was stirred at room temperature for 2 hours to synthesize trimethylethoxysilane (TMES), and a concentration of ammonia in the synthesized trimethylethoxysilane (TMES) was measured. Thereafter, acetic acid was added at the same equivalent(s) as the measured concentration of ammonia to generate a salt precipitate. The pH of the mixture in which the salt precipitate was generated was pH 7.0.

Distilled water was added to the generated trimethylethoxysilane at a volume ratio of 1:1, and stirred to dissolve the salt precipitate. Then, an aqueous layer was discarded to obtain trimethylethoxysilane (TMES) from which ammonia was removed.

Example 2

Trimethylethoxysilane from which ammonia was removed was obtained in the same manner as in Example 1, except that hexamethyldisilazane and ethanol were mixed at a mole ratio of 1:2, and then reacted for 2 hours under a reflux condition at 75° C.

Example 3

Trimethylethoxysilane from which ammonia was removed was obtained in the same manner as in Example 1, except that phosphoric acid was used instead of acetic acid, and used in an amount twice the measured equivalent of ammonia. When phosphoric acid was used instead of acetic acid, as an equivalent of phosphoric acid corresponding to the measured equivalent of ammonia was added, the generated ammonium salt [$(NH_4)_3PO_4$] was dissolved back in the solution to generate ammonia, thereby causing an increase in pH. Therefore, phosphoric acid was used in an amount twice the equivalent of ammonia. As result, the pH of the resulting mixture in which the salt precipitate was generated was pH 7.5.

Example 4

Trimethylethoxysilane from which ammonia was removed was obtained in the same manner as in Example 1, except that citric acid was used instead of acetic acid. The pH of the mixture in which the salt precipitate was generated was pH 5.0.

Example 5

Trimethylethoxysilane from which ammonia was removed was obtained in the same manner as in Example 1, except that acetic acid was used in an excessive amount (2 equivalents) compared to the equivalent of ammonia. As result, the pH of the resulting mixture in which the salt precipitate was generated was pH 4.0.

Comparative Example 1

Hexamethyldisilazane and ethanol were mixed at a mole ratio of 1:2, and then reacted for 2 hours under a reflux condition at 75° C. to synthesize trimethylethoxysilane, and the synthesized trimethylethoxysilane was distilled to obtain trimethylethoxysilane.

Comparative Example 2

Hexamethyldisilazane and ethanol were mixed at a mole ratio of 1:2, and then reacted for 2 hours under a reflux condition at 75° C. to synthesize trimethylethoxysilane, and the synthesized trimethylethoxysilane was further refluxed at 75° C. for 24 hours to obtain trimethylethoxysilane.

Comparative Example 3

Hexamethyldisilazane and ethanol were mixed at a mole ratio of 1:2, and then reacted for 2 hours under a reflux condition at 75° C. to synthesize trimethylethoxysilane, and the synthesized trimethylethoxysilane was further refluxed at 75° C. for 24 hours, and then distilled to obtain trimethylethoxysilane.

Comparative Example 4

Trimethylethoxysilane from which ammonia was removed was obtained in the same manner as in Example 1, except that hydrochloric acid was used instead of acetic acid.

Experimental Example

1) Measurement of Ammonia Content

A content of ammonia in the trimethylethoxysilane and a content of ammonia remaining in the finally obtained trimethylethoxysilane were titrimetrically analyzed using sulfuric acid, and measured using 87 Titrino plus commercially available from Metrohm AG.

2) Yield

The yield of trimethylethoxysilane was calculated according to the following Mathematical Expression 1.

$$\text{Yield (\%)} = (\text{Number of moles of obtained trimethylethoxysilane/Number of moles of hexamethyldisilazane used} \times 2) \times 100 \qquad \text{<Mathematical Expression 1>}$$

TABLE 1

| | Reaction temperature (° C.) | Content of ammonia in TMES (% by weight) | Final content of residual ammonia (% by weight) | Yield (%) | Manufacturing time (hr) |
|---|---|---|---|---|---|
| Example 1 | 25 | 2.5 | 0 | 96 | 5 |
| Example 2 | 75 | 0.9 | 0 | 92 | 5 |
| Example 3 | 25 | 2.5 | 0 | 89 | 5 |
| Example 4 | 25 | 2.5 | 0 | 82 | 5 |
| Example 5 | 25 | 2.5 | 0 | 78 | 5 |
| Comparative Example 1 | 75 | 0.9 | 0.1 | 84 | 3 |
| Comparative Example 2 | 75 | 0.9 | 0.1 | 88 | 26 |
| Comparative Example 3 | 75 | 0.9 | 0.05 | 79 | 27 |
| Comparative Example 4 | 25 | 2.5 | 0 | 77 | 5 |

As shown in Table 1, it can be seen that ammonia was not observed in the case of Examples 1 to 5, but ammonia remained in the case of Comparative Examples 1 to 3, thereby confirming more effective removal of ammonia from the trimethylethoxysilane manufactured by the manufacturing method described in Examples 1 to 5.

Also, it can be seen that ammonia was discharged in the form of a gas and removed by distillation after the trimethylethoxysilane was synthesized through a reflux reaction of hexamethyldisilazane and ethanol in the case of Comparative Example 1, and that ammonia was discharged in the form of a gas by further refluxing the synthesized trimethylethoxysilane in the case of Comparative Example 2, but the final remaining ammonia was included in the trimethylethoxysilane. In the case of Comparative Example 3, the synthesized trimethylethoxysilane was further refluxed and then re-distilled to further reduce the amount of the final remaining ammonia, but ammonia finally remained in the trimethylethoxysilane, and loss of trimethylethoxysilane by the refluxing and distillation occurred.

In terms of the manufacturing time, a total of 5 hours was spent to manufacture the trimethylethoxysilane in the case of Examples 1 to 5, which was shorter than those of Comparative Examples 2 and 3 in which a total of 26 hours and a total of 27 hours were spent to manufacture the trimethylethoxysilane, respectively. In the case of Comparative Example 1, because only the synthesis and distillation of the trimethylethoxysilane were performed, the manufacturing time was only 3 hours in total, which was shorter than those of Examples 1 to 5. However, Comparative Example 1 had inferior results compared to Examples 1 to 5 in that the yield of trimethylethoxysilane by distillation was low and a large amount of ammonia remained in the final trimethylethoxysilane.

In the case of Comparative Example 4, compared to Examples 1 to 5, ammonia was also not observed to remain in the product, but the yield of trimethylethoxysilane was lower. Based on the fact that the trimethylethoxysilane of Comparative Example 4 had a low yield, it was found that the mixture was extremely acidic because hydrochloric acid was used as the acid, and the alkoxysilane compound as the product thus synthesized was decomposed into alkylsilanol and alkyldisiloxane through a side reaction with the acid.

Meanwhile, it was confirmed from the comparison amongst the Examples that the Examples 1 and 2 had a higher yield than Examples 3 to 5. As a result, it was confirmed that a side reaction by which the alkoxysilane compound was decomposed into alkylsilanol and alkyldisiloxane was suppressed to the maximum extent because acetic acid was used in the case of Examples 1 and 2 so that the mixture was reacted in a pH range close to pH 7. However, it was confirmed that an additional amount of phosphoric acid was used relative to the equivalent of residual ammonia in order to remove ammonia generated by dissolving the generated ammonium phosphate salt in the case of Example 3, and some side reactions occurred when the mixture had a relatively low pH value of 5.0 because citric acid was used in the case of Example 4. Also, it was confirmed that the yield of trimethylethoxysilane was relatively reduced when the alkoxysilane compound as the product was decomposed into alkylsilanol and alkyldisiloxane through a side reaction with the acid because the mixture had a relatively low pH value of 4.0 because an excessive amount of acetic acid was used relative to the equivalent of ammonia in the case of Example 5.

Therefore, it can be seen that the manufacturing method of the present invention was very effective in removing ammonia and manufacturing an alkoxysilane compound because ammonia was very effectively removed by the manufacturing method of the present invention and the alkoxysilane compound was obtained with high yield. Also, it can be seen that the manufacturing method of the present invention exhibited superior effects by appropriately adjusting the type and input amount of acid.

The invention claimed is:

1. A method of manufacturing an alkoxysilane compound, comprising:
   (1) adding an alcohol to a silazane-based compound of the following Formula 1 and allowing the alcohol to react with the silazane-based compound to prepare a first mixture comprising an alkoxysilane compound and ammonia;

(2) adding an acid with pKa 2 to 6.5 to the first mixture and allowing the acid to react with the first mixture to prepare a second mixture comprising the alkoxysilane compound and an ammonium salt;
(3) adding an aqueous solvent to the second mixture to dissolve the ammonium salt; and
(4) separating and removing the aqueous layer, in which the ammonium salt is dissolved, to obtain the alkoxysilane compound:

[Formula 1]
$$(R_1)_n(R_2)_{3-n}Si\!-\!\overset{H}{N}\!-\!Si(R_2)_{3-n}(R_1)_n$$

wherein $R_1$ is an alkyl group having 1 to 8 carbon atoms, $R_2$ is a hydrogen atom or an alkyl group having 1 to 8 carbon atoms, and n is an integer ranging from 1 to 3, wherein the acid with pKa 2 to 6.5 comprises one or more selected from the group consisting of acetic acid, phosphoric acid, fluoroacetic acid, chloroacetic acid, citric acid, and formic acid, and wherein the pH of the second mixture is in a range of pH 6.5 to pH 7.5.

2. The method of claim 1, wherein the silazane-based compound comprises one or more selected from the group consisting of a dialkyldisilazane, a tetraalkyldisilazane, and a hexaalkyldisilazane.

3. The method of claim 1, wherein the alcohol comprises one or more selected from the group consisting of methanol, ethanol, propanol, isopropanol, butanol, pentanol, hexanol, heptanol, octanol, glycerol, ethylene glycol, and dipropylene glycol.

4. The method of claim 1, wherein the alkoxysilane compound comprises one or more selected from the group consisting of a monoalkoxysilane compound, a dialkoxysilane compound, and a trialkoxysilane compound.

5. The method of claim 1, wherein the alcohol is a compound of the following Formula 2, and the alkoxysilane compound is a compound of the following Formula 3:

$$R_3OH \qquad\qquad \text{[Formula 2]}$$

$$(R_1)_n(R_2)_{3-n}Si\!-\!O\!-\!R_3 \qquad \text{[Formula 3]}$$

wherein $R_1$ and $R_3$ are each independently an alkyl group having 1 to 8 carbon atoms, $R_2$ is a hydrogen atom or an alkyl group having 1 to 8 carbon atoms, and n is an integer ranging from 1 to 3.

6. The method of claim 1, wherein the acid with pKa 2 to 6.5 is acetic acid.

7. The method of claim 1, wherein the acid with pKa 2 to 6.5 is added to the first mixture at an equivalence ratio of 1:1 to 1.5:1 with respect to the ammonia in the first mixture.

8. The method of claim 1, further comprising, before adding the acid with pKa 2 to 6.5 to the first mixture:
   measuring a concentration of ammonia present in the first mixture.

9. The method of claim 1, wherein the pH of the second mixture is in a range of pH 6.5 to pH 7.

10. The method of claim 1, wherein the silazane-based compound is hexamethyldisilazane, the alcohol is ethanol, and the alkoxysilane is trimethylethoxysilane.

11. The method of claim 1, wherein the reaction of the alcohol with the silazane-based compound in Step (1) is performed in the presence of an acid catalyst.

12. The method of claim 11, wherein the acid catalyst comprises one or more selected from the group consisting of nitric acid, hydrochloric acid, acetic acid, sulfuric acid, and hydrofluoric acid.

* * * * *